(12) United States Patent
Bauer

(10) Patent No.: US 8,550,224 B2
(45) Date of Patent: Oct. 8, 2013

(54) ENERGY ABSORPTION SYSTEM

(75) Inventor: Roland Bauer, Altdorf (DE)

(73) Assignee: Fischer Seats International GmbH, Landshut (DE)

( * ) Notice: Subject to any disclaimer, the term of this patent is extended or adjusted under 35 U.S.C. 154(b) by 274 days.

(21) Appl. No.: 12/420,186

(22) Filed: Apr. 8, 2009

(65) Prior Publication Data

US 2009/0250851 A1   Oct. 8, 2009

(30) Foreign Application Priority Data

Apr. 8, 2008   (DE) .......................... 10 2008 017 815

(51) Int. Cl.
  *F16F 7/12*   (2006.01)
(52) U.S. Cl.
  USPC ........................................................ 188/371
(58) Field of Classification Search
  USPC ...................... 188/371–374; 267/136, 140.11;
                        244/17.11, 118.5, 122 R
  See application file for complete search history.

(56) References Cited

U.S. PATENT DOCUMENTS

| | | | | |
|---|---|---|---|---|
| 3,146,014 A | * | 8/1964 | Kroell | 293/133 |
| 4,054,156 A | * | 10/1977 | Benson | 137/630.12 |
| 4,901,594 A | * | 2/1990 | Selzer | 74/501.5 H |
| 5,211,694 A | * | 5/1993 | Sakakida et al. | 280/806 |
| 6,189,929 B1 | | 2/2001 | Struble et al. | |

FOREIGN PATENT DOCUMENTS

| | | |
|---|---|---|
| DE | 41 34 545 C2 | 11/1992 |
| FR | 2 375 499 A1 | 7/1978 |
| WO | WO 2005002676 * | 1/2005 |
| WO | 2007/093283 A1 | 9/2007 |

* cited by examiner

*Primary Examiner* — Bradley King
*Assistant Examiner* — Vishal Sahni
(74) *Attorney, Agent, or Firm* — Alston & Bird LLP

(57) ABSTRACT

The present invention relates to an energy absorption system. The energy absorption system comprises a movable carriage, a fixed bearing and a deformable material strip. The deformable material strip is at least areally connected to the fixed bearing. Between the movable carriage and the fixed bearing a gap is formed. The energy absorption system further comprises means, which are suited to vary the size of the gap between the movable carriage and the fixed bearing.

12 Claims, 5 Drawing Sheets

$S_{max}$

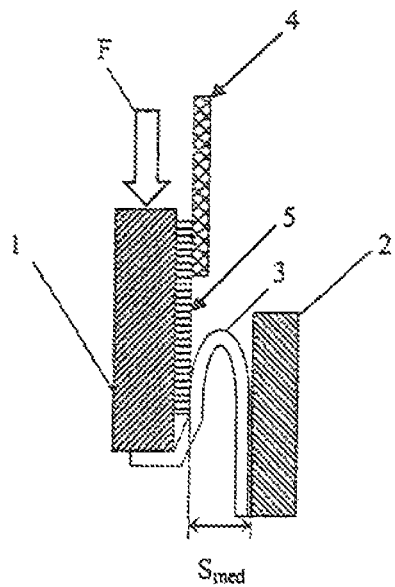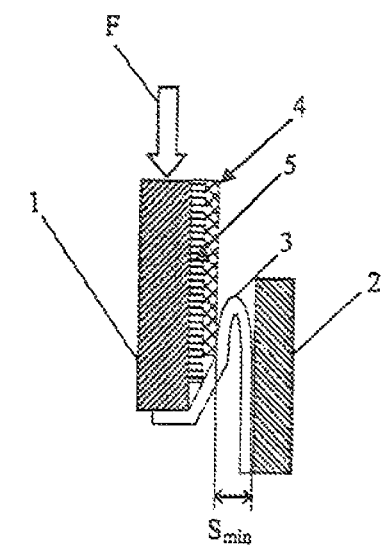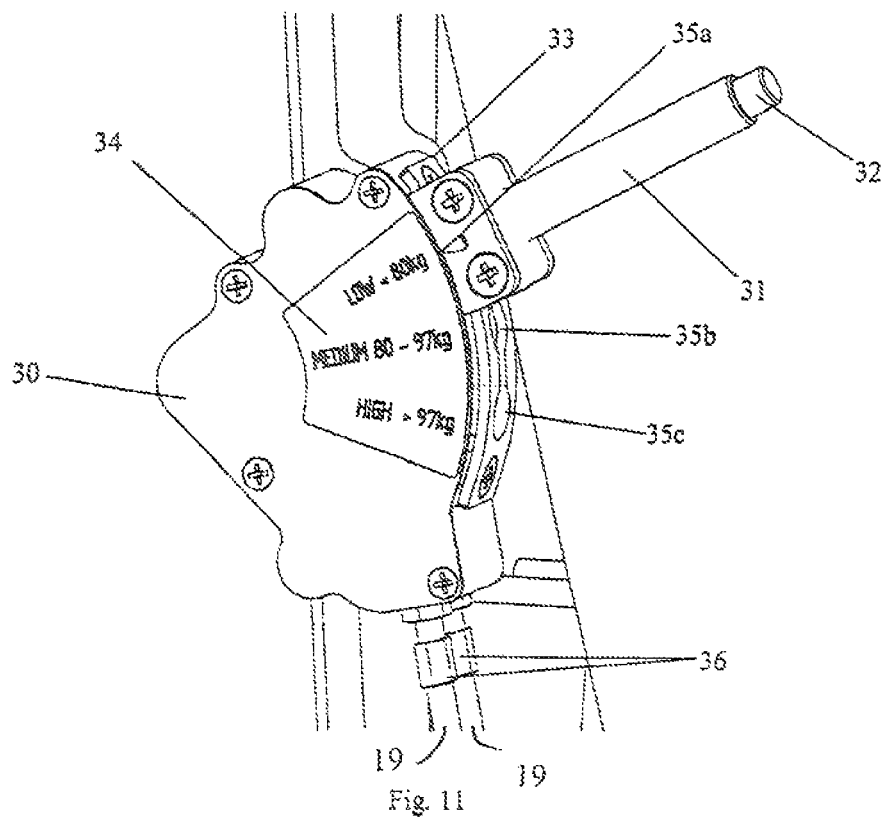

ENERGY ABSORPTION SYSTEM

CROSS-REFERENCE TO RELATED APPLICATIONS

Pursuant to 35 U.S.C. 119(a), the instant application claims priority to prior German application number 10 2008 017 815.2, filed Apr. 8, 2008.

BACKGROUND OF THE INVENTION

The present invention relates to an energy absorption system, which is in particular suited for seats in helicopters, air planes and motor vehicles. The energy absorption system consists of a movable carriage, a fixed bearing and a deformable material strip, wherein the deformable material strip is at least areally connected to the fixed bearing. The energy absorption system may be adjusted to a weight range being suited for the passenger.

It is a commonly known problem, that during the transport of persons shocks may occur, which have to be absorbed in order that the person does not suffer any harm. In this regard it is necessary to transform the shock energy, such that the remaining impact onto the person is as low as possible. One possibility is the use of shock absorbers, which store the energy by means of spring effect and transfer the energy over a longer range of time being determined by the oscillation period, so that the shock may be reduced. An improved absorption of shocks is achieved when the shock energy is transformed into a non-mechanical energy. Such systems are designated as energy absorption systems. The energy absorption is thereby enabled through one or more absorption elements.

From DE 41 34 545 C2 an energy absorption element is known in which between two profile parts a material strip is located, which is attached in a areally removable manner at one profile part and is permanently attached to the other profile part. If a shock or tension occurs between the two profile parts, the energy from the areal connection between the material strip and the profile part is absorbed, in such a way that the areal attachment is removed. The known material strip is for example attached by bonding, welding or by means of rivets. Removing of the material strip requires energy, whereby the shock energy is used up. The material strip consists of flexible and tear-resistant material. Since in these energy absorption elements the deformation is not crucial for the energy absorption, various materials may be applied. This characteristic is advantageous for the light weight construction and enables a cost efficient production.

This known material strip has in the past been used among others in energy absorption systems for helicopter seats. The material strip was thereby fixably attached to a movable carriage and attached areally strippable at the seat leg. The stripping of the material strip from the seat leg—and thus the stroke of the movable carriage—became in this case the bigger the higher the weight of the passenger on the respective seat has been. A weight depending limitation of the carriage stroke has not been possible up to now.

BRIEF SUMMARY OF THE INVENTION

It is thus the object of the present invention to create an energy absorption system which enables, by using the known material strip, a multi-stage weight depending adjustment which ensures that the stroke of the movable carriage does not exceed a certain threshold value.

This object is solved according to the invention by an energy absorption system which comprises a movable carriage, a fixed bearing and a deformable material strip, wherein the deformable material strip is at least areally connected to the fixed bearing and wherein between the movable carriage and the fixed bearing a gap is formed, wherein the energy absorption system further comprises means, which are suited to vary the size of the gap which is formed between the movable carriage and the fixed bearing.

In a preferred embodiment of the invention, the deformable material strip is arranged between the movable carriage and the fixed bearing in a substantially U-shaped configuration. Due to this geometric arrangement, the shock energy may, during a relative movement of the carriage with regard to the bearing, be absorbed in a particular efficient manner through the respective removing of the strip from the fixed bearing. Generally, the carriage will, for example during an ungentle landing, move downwards in the direction of the cabin floor (i.e. a pressure force is present) wherein the U-shaped configuration of the material strip is upside down. However, also other applications are conceivable, in which a tensile force has to be absorbed, wherein then the U-shaped configuration is respectively arranged contrary-wise. The material strip regularly consists of a flexible and tear-resistant material.

In a further preferred embodiment of the invention the means comprise a first sheet and a second sheet, which may be coupled to the movable carriage. In this regard it is distinguished between various settings: The carriage may (1) be coupled neither with the first nor with the second sheet, (2) only be coupled with one of the two sheets or finally (3) be coupled with both sheets. Due to these coupling options, the size of the gap between the movable carriage and the fixed bearing may be provided variable. In the alternative (1) the gap comprises the largest size, in the alternative (2) the gap comprises a medium size and in the alternative (3) the gap comprises the narrowest size. The narrower the gap is adjusted the more bent is the U-shaped configuration of the material strip if the carriage is—with one or both sheets—moved in the direction of the cabin floor. A stronger bending of the material strip provides that the stroke of the carriage, with the same force effect, is smaller as if a less strong bending is provided. Based on this principle the hub of the carriage may be chosen in such a way, that also if persons with different weight sit onto the seat, a certain threshold respectively maximum value is not exceeded. This is interesting in particular for the area of aviation, where the space available for absorbing the shock energy is limited by the height of the seat and the necessary supporting structures for the seat. It is also conceivable, that only one sheet is used, which is either coupled with the movable carriage or decoupled from the latter.

In another preferred embodiment of the invention the first sheet and the second sheet are respectively coupled to the movable carriage by means of a first respectively a second piston element. Only by means of this coupling the possibility is created to make the gap formed between the movable carriage and the fixed bearing narrower respectively wider. In this connection the first respectively the second piston element comprise front parts having the shape of pins, which engage, through channels within the movable carriage, into respective openings or slots of the first and the second sheets.

In a still further embodiment of the invention the first piston element and the second piston element may be actuated via a bowden cable by means of a lever mechanism. In this way, a simple and reliable adjustment of the energy absorption system to various weight ranges may be achieved. The control of the piston elements may also occur by other means, as for example a lever linkage. Further, pneumatic, magnetic and/or electric solutions are conceivable.

In a further preferred embodiment of the invention the bowden cable is anchored within the first piston element. By means of this embodiment of the pistons, in a first step the first sheet may be coupled or decoupled, while the second sheet remains coupled with the movable carriage.

Preferably, the lever mechanism comprises at least two different latching positions. When using a single sheet no sub-division into two different weight ranges occurs. When using two sheets usually three latching positions are provided, which enable the adjustment of the energy absorption system into three weight ranges, which correspond to the above described alternatives (1) to (3). A practically advantageous sub-division has resulted in that alternative (1) is provided for a weight below 80 kg, alternative (2) is provided for a weight between 80 and 97 kg and that alternative (3) is provided for a weight above 97 kg. Of course—if applicable—also other settings may be provided. Also, more than two sheets with an appropriate thickness may be coupled to the carriage in order to enable a still finer adjustment of the weight ranges. In principle, also other means than sheets are conceivable in order to vary the width of the gap.

In a further preferred embodiment of the invention, the first piston element and the second piston element are arranged in a connector housing. The connector housing enables a reliable guidance of the piston elements.

In a further preferred embodiment of the invention, the first piston element is arranged within the second piston element. In this way also a spatially suited arrangement of the piston elements is achieved.

In a further preferred embodiment of the invention, the first piston element is held within the second piston element by means of a first spring and the second piston element is held within the connector housing by means of a second spring. The springs thereby provide the counter force for the bowden cable.

In a further preferred embodiment of the invention the first piston element interacts with a bushing, which protrudes through a bore into the connector housing. The bushing serves for receiving the shaft of the first piston element and as an additional guidance for the bowden cable. The bushing further comprises a circumferential projection, by means of which it abuts at the outside of the connector housing.

BRIEF DESCRIPTION OF THE SEVERAL VIEWS OF THE DRAWING

By means of the drawings the inventive energy absorption system is illustrated.

FIG. 5 is a schematic illustration of an inventive energy absorption system in which according to alternative (2) one sheet is coupled with the movable carriage after a force effect.

FIG. 6 is a schematic illustration of an inventive energy absorption system in which according to alternative (3) both sheets are coupled with the movable carriage after a force effect.

FIG. 11 is a perspective view of a lever mechanism for an inventive energy absorption system.

DETAILED DESCRIPTION

Figure 1:
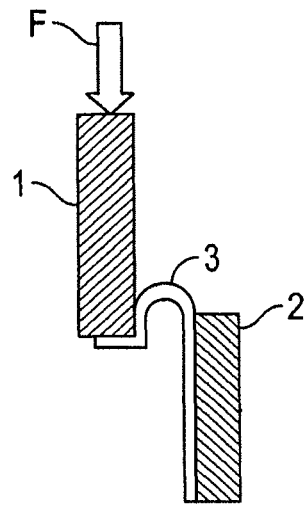
FIG. 1 is a schematic illustration of an energy absorption system according to the prior art in the normal position.
Figure 2:
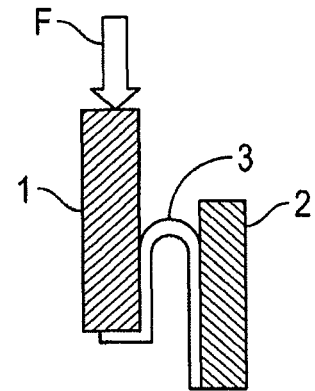
FIG. 2 is a schematic illustration of an energy absorption system according to the prior art after a force effect.

In the known energy absorption system shown in FIG. 1 there is in the normal condition of the substantially U-shaped respectively U-like bent material strip 3, the longer leg areally connected with the inner side of the fixed bearing 2. Following the bending, the shorter leg of the substantially U-shaped material strip 3 abuts at the inner side of the movable carriage 1 and is usually screwed to the lower side of the latter. If, due to the effect of a force F—for example during an ungentle landing or a crash—the movable carriage 1, as shown in FIG. 2 is pushed downwards a partial stripping respectively excoriation of the longer leg of the substantially U-shaped material strip 3 from the fixed bearing 2 occurs. The bending of the substantially U-shaped material strip 3 thereby moves downward together with the movable carriage 1 so that the leg of the substantially U-shaped material strip 3 being connected to the movable carriage 1 is extended. Hereby, the crash energy is received respectively absorbed in a highly efficient manner. An adjustment of such an energy absorption system to persons having a different weight has not been possible up to now.

Figure 3:
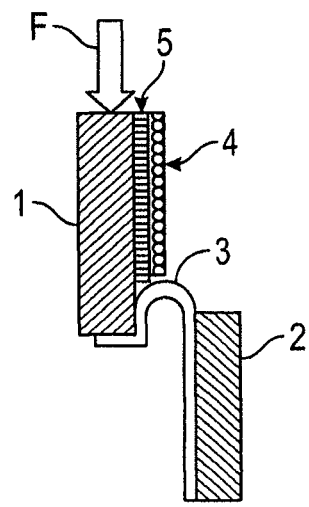
FIG. 3 is a schematic illustration of an inventive energy absorption system with two sheets in the normal position.

In FIG. 3 there is now shown an inventive energy absorption system. The latter comprises as already in the known system shown in FIGS. 1 and 2 a substantially U-shaped material strip 3, which is screwed to the movable carriage 1 and which is areally connected to the fixed bearing 2. In addition, the inventive energy absorption system comprises a first sheet 4 and a second sheet 5, which in the illustrated normal condition abut at the movable carriage 1 and may—depending on the weight of the person which wants to sit down on the seat—be coupled with the latter. Thereby it is distinguished between three alternatives (1) to (3).

Figure 4:
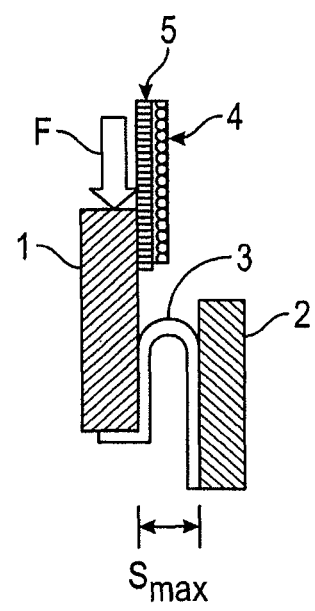
FIG. 4 is a schematic illustration of an inventive energy absorption system in which according to alternative (1) both sheets are decoupled from the movable carriage after a force effect.

In alternative (1) shown in FIG. 4, which is suited for light weight persons, for example below 80 kg, neither of the two sheets 4 or 5 is coupled to the movable carriage 1 (the functioning of the corresponding coupling mechanism is explained further below). Under the effect of force F the carriage 1 is thus pressed downwards without the two sheets 4 and 5. The gap S formed between the movable carriage 1 and the fixed bearing 2 comprises in this alternative a maximum value (S.sub.max). Also in this case a part of the longer leg of the substantially U-shaped material strip 3 being areally connected with the bearing 2 is stripped respectively excoriated from the latter in order to absorb the crash energy. Thereby, again the bending moves downwards and the shorter leg of the substantially U-shaped material strip 3 which abuts respectively is connected with the movable carriage 1 is extended.

In the alternative (2) shown in FIG. 5, which is suited for middle weight persons, for example between 80 and 97 kg, the second sheet 5 is coupled with the movable carriage 1 (the functioning of the corresponding coupling mechanism is explained further below). Under the effect of the force F the movable carriage 1 is thus pressed downwards together with the second sheet 5. The gap S being now formed between the movable carriage 1 (inclusive sheet 5) and the fixed bearing 2 comprises in this alternative a medium value ($S_{med}$). In other words, the gap S is reduced by the second sheet 5 being coupled to the movable carriage 1, whereby also the bending of the substantially U-shaped material strip 3 gets stronger (i.e. the bending radius is smaller with regard to alternative (1)). The second sheet may abut during the downward movement of the movable carriage 1 at the shorter leg of the substantially U-shaped material strip and deform the latter, if applicable.

In the alternative (3) shown in FIG. 6, which is suited for heavy weight persons, for example above 97 kg, the first sheet 4 and the second sheet 5 are coupled to the movable carriage 1 (the functioning of the corresponding coupling mechanism is explained further below). Under the effect of the force F the movable carriage 1 is thus pressed downwards together with the first sheet 4 and the second sheet 5. The gap S being now formed between the movable carriage 1 (inclusive sheets 4 and 5) and the fixed bearing 2 comprises in this alternative a minimum value ($S_{min}$). In other words, the gap S is further reduced by means of the sheets 4 and 5 being coupled to the movable carriage 1, whereby again the bending of the substantially U-shaped material strip 3 is enhanced (i.e. the bending radius is reduced with regard to alternative (2)). The first and/or second sheet 4, 5 may during the downwards movement of the movable carriage 1 regularly abut at the shorter leg of the substantially U-shaped material strip 3 and deform the latter, if applicable.

Figure 7:
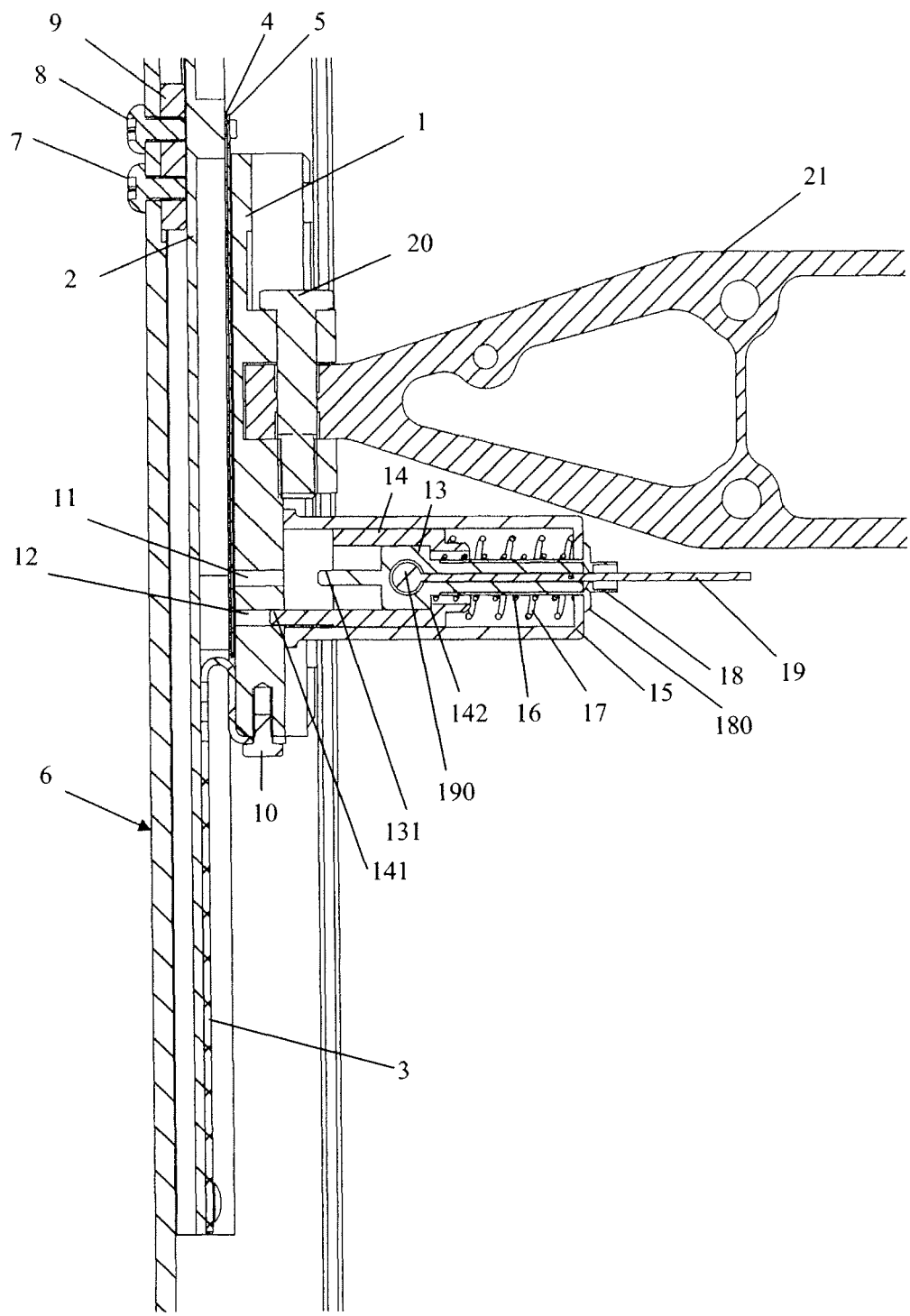
FIG. 7 is a cross-section through an inventive energy absorption system in the setting according to alternative (1).

FIG. 7 illustrates a cross-section through an inventive energy absorption system and the substantial parts of the latter in the setting according to alternative (1). A frame element 6 is thereby fixed by means of two screws 7, 8 at a mounting, whereby an intermediate element 9 is used. At the fixed bearing 2 there is areally (large scale) arranged the substantially U-shaped material strip 3 which is mounted at the movable carriage 1 by means of a screw 10. Between the fixed bearing 2 and the movable carriage 1 the first sheet 4 and the second sheet 5 are arranged. The sheets 4, 5 respectively comprise recesses respectively slots (cf. FIG. 10) for coupling with the movable carriage 1. The movable carriage 1 comprises a first channel 11 and a second channel 12 for receiving a front part 131, 141 of a first piston element 13 and of a second piston element 14. The two piston elements 13, 14 are thereby arranged in a connector housing 15, which abuts at the movable carriage 1. The second piston element 14 is formed cylindrically and encloses the first piston element 13, such that the first piston element 13 is arranged within the second piston element 14. The first piston element 13 is held by means of a first spring 16 within the connector housing 15 and the second piston element 14 is held within the connector housing 15 by means of the second spring 17. The first piston element 13 abuts at a stopper 142 of the second piston element 14. The first piston element 13 interacts with a bushing 18, which protrudes through a bore 152 into the connector housing 15. The shaft 130 of the first piston element 13 is thereby displaceably arranged within the bushing 18. The bushing 18 abuts with the circumferential projection 180 onto the connector housing 15. Through the bushing 18 and the shaft 130 of the first piston element 13 runs a bowden cable 19, which is anchored by means of a sphere 190 in a corresponding recess in the first piston element 13. At the movable carriage 1 a support 21 is attached by means of a bolt 20.

With regard to the inventive coupling mechanism there is located in the shown setting according to alternative (1) a front part 141 of the second piston element 14 within the second channel 12 of the movable carriage 1, which is however not in engagement with one of the sheets 4 or 5. The front part 131 of the first piston element 13 is fully located within the connector housing 15. By means of a lever mechanism, which is explained further below in FIG. 11, the first and the second piston element 13, 14 have been brought against the force of the first and of the second spring 16, 17 into a position via the bowden cable 19, in which during the downward movement of the carriage 1 none of the sheets 4, 5 is carried along. This leads to the gap $S_{max}$ which is illustrated in FIG. 4.

Figure 8:
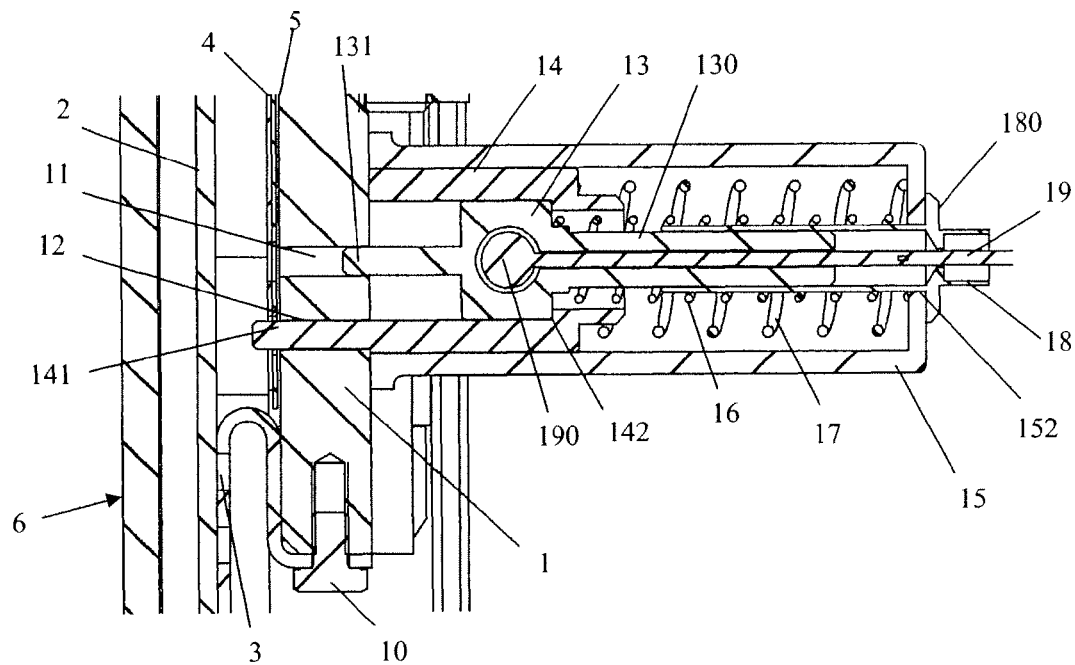
FIG. 8 is a cross-section through the coupling mechanism of an inventive energy absorption system in the setting according to alternative (2).

FIG. 8 illustrates the inventive coupling mechanism in the setting according to alternative (2). Here, the front part 141 of the second piston element 14 passes through the second channel 12 of the movable carriage 1 and through the second sheet 5 and the first sheet 4. The second sheet 5 comprises thereby a bore 50 (cf. FIG. 10) and the first sheet 4 comprises a slot 40 (cf. FIG. 10). In this way it is achieved, that the second piston element 14 is in engagement with the second sheet 5, but not with the first sheet 4. Compared with the setting shown in FIG. 7 according to alternative (2) both piston elements 13 and 14 have been moved further out of the connector housing 15. The front part 131 of the first piston element 13 has already been moved slightly into the first channel 11 of the movable carriage 1; it is however not yet into engagement with one of the sheets 4 or 5. The actuation of the piston elements 13, 14 occurs again via the lever mechanism according to FIG. 11. Via the bowden cable 19 the first piston element 13 and the second piston element 14 are brought into position by means of the force of the first spring 16 and of the second spring 17 in which during a downward movement of the carriage 1 the second sheet 5 is coupled to the latter. This leads to the gap $S_{med}$ illustrated in FIG. 5.

Figure 9:
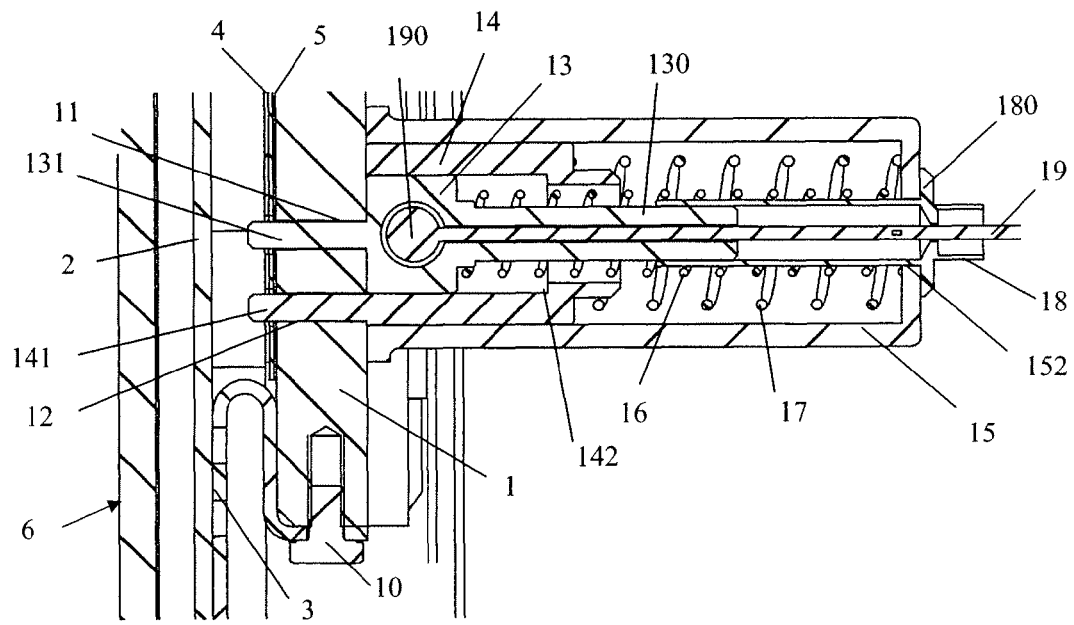
FIG. 9 is a cross-section through the coupling mechanism of an inventive energy absorption system in the setting according to alternative (3).

FIG. 9 illustrates the inventive coupling mechanism in the position according to alternative (3). Here, the front part 141 of the second piston element 14 passes through the second channel 12 of the movable carriage 1 as well as the front part 131 of the first piston element 13 through the first channel 11 of the movable carriage 1. The front part 141 of the second piston element 14 passes in addition through the bore 50 of the second sheet 5 and through the slot 40 of the first sheet (cf. FIG. 10). In addition, the front part 131 of the first piston element 13 passes through the bore 51 of the second sheet 5 and through the bore 51 of the first sheet 4. In this setting, the piston elements 13, 14 have, with regard to alternative (2) been still moved somewhat further out of the connector housing. In this manner it is achieved, that the second piston element 14 is in engagement with the second sheet 5 and that the first piston element 4 is in engagement with the first sheet 4. The actuation of the piston elements 13, 14 occurs thereby again via the lever mechanism according to FIG. 11. Via bowden cable 19, the first piston element 13 and the second piston element 14 are brought into a position by means of the force of the first spring 16 and of the second spring 17 in which during a downward movement of the carriage 1 the first sheet 4 and the second sheet 5 are coupled with the latter. This leads to the gap $S_{min}$ illustrated in FIG. 6.

Figure 10:
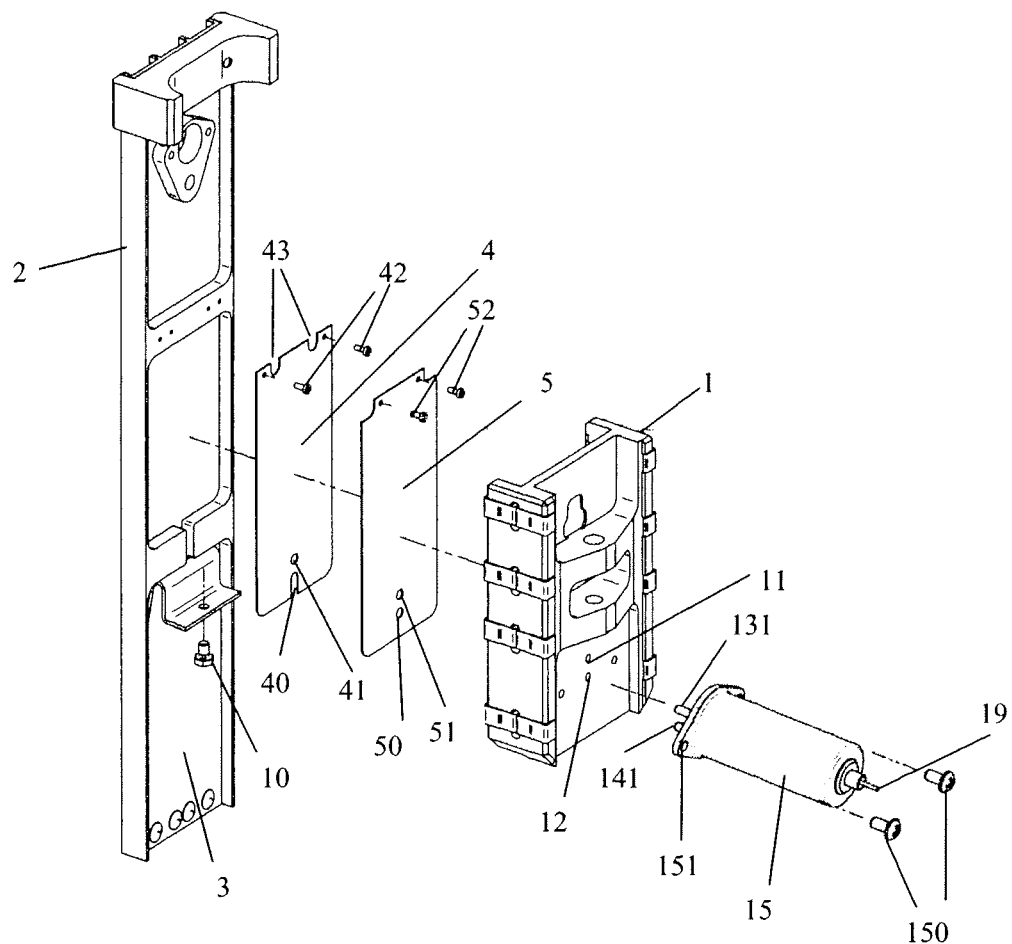
FIG. 10 is an exploded view of certain parts of the inventive energy absorption system.

In FIG. 10 the fixed bearing 2, the substantially U-shaped material strip 3, the movable carriage 1, the first and the second sheet 4, 5 as well as the connector housing 15 are illustrated individually. The substantially U-shaped material strip 3 is thereby mounted at the movable carriage 1 by means of the screw 10. As can be seen, the first sheet 4 is rippably mounted at the fixed bearing 3 by means of two screws 42. The second sheet 5 is rippably mounted at the fixed bearing 2 by means of two screws 52 wherein in the first sheet 4 two recesses 43 for the screws 52 are provided. The connector housing 15 with the side parts 151 is mounted at the movable carriage 1 by means of two screws 150. In the connector housing 15 the first and the second piston elements 13, 14 are arranged wherein respectively the front parts 131, 141 are visible. In the setting according to FIG. 9 (alternative (3)) the front part 141 of the second piston element 14 passes through the second channel 12 within the movable carriage 1, the opening 50 in the second sheet 5 and through the slot 40 in the first sheet 4. The front part 141 of the first piston element 13 passes through the channel 11 in the movable carriage 1, the opening 51 in the second sheet and through the opening 41 in the first sheet 4. In order to get into the setting according to FIG. 8 (alternative 2)) the front part 131 of the first piston element 13 is pulled out of the openings 41, 51 via the bowden cable 19 by means of a lever mechanism (cf. FIG. 11). In order to further get into the setting according to FIG. 7 (alternative 1)), additionally the front part 141 of the second piston element 14 is pulled out of the slot 40 and the opening 50 via the bowden cable 19.

In FIG. 11 finally the inventive lever mechanism is shown. The latter consists of a housing 30, a lever 31 with a push button 32 and a latching rail 33 having three latching stages 35a, 35b and 35c. Beside the latching rail 33 there is arranged onto the housing 30 a scale 34, which shows the weight ranges below 80 kg, between 80 and 97 kg as well as above 97 kg, which correspond with three latching stages 35a, 35b and 35c. By means of the lever 31 and the push button 32 the bowden cable 19, which runs in the covering 36 to the first piston element 13 where it is anchored, may be actuated via a common mechanics. Since the inventive energy absorption system is regularly arranged on both sides of a seat presently two coverings 36 for two bowden cables 19 are illustrated. The shown lever setting in the latching stage 35a (below 80 kg) corresponds to FIG. 7 (alternative (1)) in which both sheets 4, 5 are decoupled from the movable carriage 1. The springs 16, 17 are biased and both piston elements 13, 14 are positioned within the connector housing 15; only the front part 141 of the second piston element 14 protrudes slightly into the second channel 12 of the movable carriage 1. In order to get into the medium setting (between 80 and 97 kg) the lever 31 is brought into the next latching stage 35b. Thereby the springs 16, 17 are relieved via the bowden cable 19 and the two piston elements 13, 14 are moved into the direction of the fixed bearing 2, wherein the second piston element 14 abuts at the movable carriage 1 and gets, with its front part 141, through the second channel 12 of the movable carriage 1 into engagement with the opening 50 in the second sheet 5 (cf. FIG. 10). Within the slot 40 of the first sheet 4 the front part 141 of the first piston element 14 may in contrast be moved freely downwards (cf. FIG. 10). The shorter front part 131 of the first piston element 13 is however moved slightly into the first channel 11; it does not yet get into engagement with one of the sheets 4, 5. This setting corresponds to FIG. 8 (alternative 2)). In order to get into the lower setting (above 97 kg) the lever 31 is brought into the latching stage 35c. Thereby, the first spring 16 is further relieved via the bowden cable 19, wherein the first piston element 13 is displaced within the second piston element 14, such that it leaves the stopper 142. The second piston element 14 already abuts at the movable carriage 1 and is not moved any further. The front part 131 of the piston element 13 respectively gets into engagement with the second and the first sheet 5, 4 via the openings 51, 41 (cf. FIG. 10). This setting corresponds to FIG. 9 (alternative (3)).

LIST OF REFERENCE SIGNS

1 movable carriage
2 fixed bearing
3 material strip
4 first sheet
5 second sheet
6 frame element
7 screw
8 screw
9 intermediate element
10 screw
11 first channel
12 second channel
13 first piston element
14 second piston element
15 connector housing
16 first spring
17 second spring
18 bushing
19 bowden cable
20 bolt
21 support
30 housing
31 lever
32 push button
33 latching rail
34 scale
35a, b, c latching stages
36 covering
40 slot
41 opening
42 screws
43 recess
50 opening
51 opening
52 screws
130 shaft
131 front part
141 front part
150 screws
151 side parts
152 bore
180 projection
$S_{max}$ maximum gap
$S_{med}$ medium gap
$S_{min}$ minimum gap

The invention claimed is:
1. An energy absorption system comprising:
a movable carriage movable between a rest position and an operative position during an energy absorption event;
a fixed bearing;
a U-shaped deformable material strip being arranged in a gap defined between the movable carriage and the fixed bearing, the U-shaped deformable material strip having first and second legs defining a bending radius therebetween, wherein the first leg of the U-shaped deformable material strip is fixedly connected to the moveable carriage and the second leg of the U-shaped deformable material strip is at least areally connected with the fixed bearing;
a first sheet and a second sheet, wherein the first and second sheets are arranged in the gap defined between the movable carriage and the fixed bearing; and
coupling elements configured to define
as a first setting, an uncoupled setting in which the first and second sheet are decoupled from the movable carriage,
as a second setting, a coupled setting in which the second sheet is coupled to the moveable carriage and the first sheet is decoupled from the moveable carriage, and as a third setting, a further coupled setting in which the first and second sheet are coupled to the moveable carriage;

wherein, when an energy absorption event causes the movable carriage to move from the rest position to the operative position, in the first setting, none of the first and second sheet is moved with the moveable carriage, and in the second and third setting, the second and the first and second sheet, respectively, are moved with the movable carriage between the U-shaped deformable material strip and the movable carriage to reduce the bending radius between the first and second legs of the U-shaped deformable material strip, and wherein the first, second, and third settings correspond to weight ranges of the users of the energy absorption system.

2. The energy absorption system according to claim 1, wherein the one or more coupling elements comprise a first piston element and a second piston element.

3. The energy absorption system according to claim 2, wherein in a first setting the first piston element engages into an opening in the first sheet and wherein in a second setting the second piston element engages into an opening in the first sheet and into an opening in the second sheet.

4. The energy absorption system according to claim 2, wherein the first piston element and the second piston element are actuated via a bowden cable by means of a lever mechanism.

5. The energy absorption system according to claim 4, wherein the bowden cable is anchored in the first piston element.

6. The energy absorption system according to claim 4, wherein the lever mechanism includes at least two different latching stages.

7. The energy absorption system according to claim 2, wherein the first piston element and the second piston element are arranged in a connector housing.

8. The energy absorption system according to claim 2, wherein the first piston element is arranged within the second piston element.

9. The energy absorption system according to claim 2, wherein the first piston element is held by a first spring within the second piston element and wherein the second piston element is held within the connector housing by a second spring.

10. The energy absorption system according to claim 2, wherein the first piston element interacts with a bushing which protrudes through a bore into the connector housing.

11. The energy absorption system according to claim 10, wherein the bushing comprises a circumferential projection.

12. The energy absorption system according to claim 1 wherein the first and second sheets are rippably mounted to the fixed bearing before the energy absorption event.

* * * * *